United States Patent
Trambarulo

[11] 3,734,594
[45] May 22, 1973

[54] OPTICAL FIBER CONNECTOR

[75] Inventor: Ralph Francis Trambarulo, Red Bank, N.J.

[73] Assignee: Bell Telephone Laboratories, Incorporated, Murray Hill, N.J.

[22] Filed: Mar. 29, 1972

[21] Appl. No.: 239,034

[52] U.S. Cl............350/96 B, 350/96 R, 350/96 WG
[51] Int. Cl..................................................G02b 5/16
[58] Field of Search..........................350/96 R B WG

[56] References Cited
UNITED STATES PATENTS 3,406,373  10/1968  Forney..............................174/89 X
3,455,625  7/1969  Brumley et al......................350/96 B
3,461,304  8/1969  Genahr et al.......................250/227

*Primary Examiner*—David H. Rubin
*Attorney*—W. L. Keefauner

[57] ABSTRACT

An optical fiber connector comprises a deformable, annular core disposed between a pair of metallic pressure plates. The two fibers to be spliced are inserted into opposite ends of the core, and a longitudinal force applied to the plates. This causes the core to deform radially, simultaneously aligning and mechanically securing the fibers. Removing the pressure releases the fibers.

A core with a plurality of holes can be used to connect the fibers of a fiber cable.

8 Claims, 4 Drawing Figures

OPTICAL FIBER CONNECTOR

This invention relates to apparatus for connecting optical fibers.

BACKGROUND OF THE INVENTION

There is, currently, a great deal of interest in using dielectric fibers as waveguides at optical frequencies in much the same way as wires and metallic waveguides are used at the lower frequencies. However, if such fibers are to be used in this way, it is evident that there will be a corresponding need for a quick, convenient and inexpensive means for connecting sections of fiber together in the course of their use.

It is, accordingly, the broad object of the present invention to connect optical fibers in a mechanically sound and optically efficient manner.

More particularly, it is an object of the invention to connect optical fibers in a manner which automatically aligns the fibers during the connecting process.

SUMMARY OF THE INVENTION

A connector, in accordance with the present invention, comprises a deformable, annular core disposed between a pair of annular pressure plates. The two fibers to be connected are inserted into opposite ends of the connector, and longitudinal pressure is applied to the two pressure plates. This causes the core to bulge radially inward, thereby simultaneously aligning and clamping the two fibers.

It is an advantage of the present invention that the fibers can be disconnected simply by removing the pressure applied to the pressure plates.

It is a further advantage of the invention that no special equipment nor special procedure is required to align the fibers.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
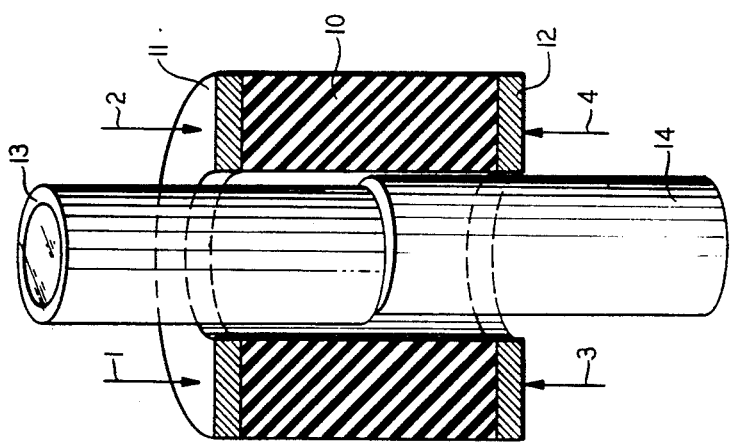
FIG. 1 shows, in cross section, a fiber connector in accordance with the present invention.

Referring to the drawings, FIG. 1 shows a connector, in accordance with the present invention, comprising a deformable, annular core 10 and a pair of annular pressure plates 11 and 12 disposed, respectively, on opposite sides of core 10. A typical core material might be silicone rubber. More generally, any stable, pliable material can be used for this purpose. The pressure plates, on the other hand, are preferably made of a rigid material, such as metal.

The connector is provided with means for applying a longitudinal force to the pressure plates 11 and 12. This is indicated, symbolically, by the oppositely-directed arrows 1, 2 and 3, 4. The result of applying this force is considered in greater detail hereinbelow.

Figure 2:
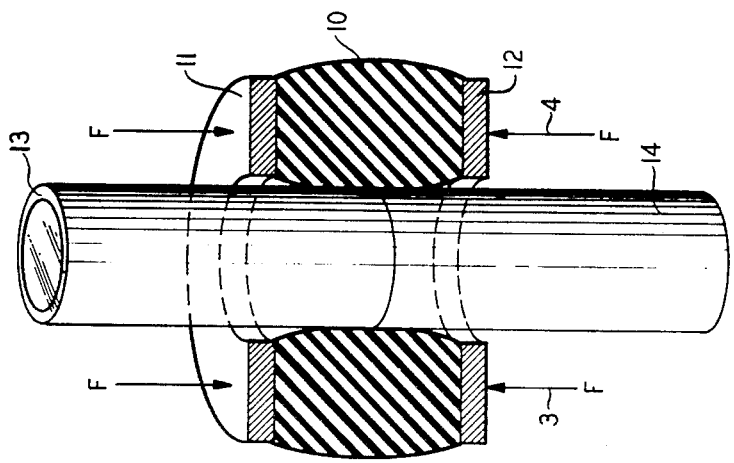
FIG. 2 shows the effect produced by the application of a longitudinal force to the connector of FIG. 1.

The hole through plates 11 and 12, and core 10 is slightly oversized with respect to the diameter of the fibers to be connected so that the latter are easily inserted into the connector, as indicated in FIG. 1. In particular, FIG. 1 shows an exaggerated situation wherein the connector hole diameter is so much larger than the fiber diameter that the two fibers 13 and 14 are axially displaced relative to each other. As is known, the coupling efficiency decreases as a function of the relative axial displacement of the two fibers. Accordingly, the most efficient connection is obtained when the fibers are coaxially aligned, and maintained in this alignment by the connector. In the instant case, alignment and clamping of the fibers occur automatically, as illustrated in FIG. 2.

To make a connection, the two fibers are inserted into opposite ends of the connector until their respective ends are in contact. While the ends of the fibers need not be optically polished, it is preferred that they be flat. It may also be advantageous if the fibers have a solid core to place a drop of fluid, having a matching refractive index, on one or both of the fibers to insure that there are no discontinuities at their junction.

To complete the connection, a force F is applied to the pressure plates, deforming core 10. In particular, because of the axial symmetry of the connector, there is a uniform, radially inward displacement of the core material which automatically aligns the two fibers along a common axis. In addition there is also a longitudinal displacement of the core material due to its compression which simultaneously forces the fibers together, making a firm, intimate contact between the fiber ends. Finally, the combination of the radial displacement and the longitudinal compression of the core material clamps the two fibers in a firm and securely fixed position, and seals the connection. This has the advantageous property of keeping the connection free of foreign matter which might otherwise degrade the coupling efficiency. In the case of liquid core fibers, the sealing effect has the added advantage of preventing any leakage of the fiber core fluid.

The connection is maintained so long as force is applied to the pressure plates. Where a permanent connection is sought, the connector is encapsulated in a suitable rigid material. Where a less permanent connection is sought, the connector can be simply wrapped for added protection. In this latter case, the fibers can then be disconnected at a later time by releasing the force applied to the pressure plates.

Figure 3:
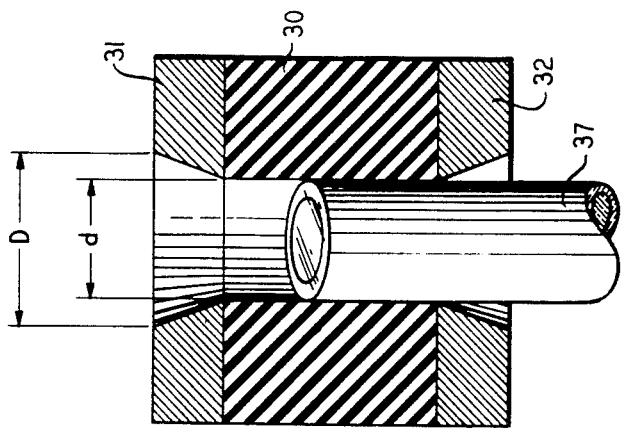
FIG. 3 shows a modified embodiment of the invention.

It will be recognized that the greater the difference between the connector hole diameter and the fiber diameter, the greater the force needed to make a connection. Accordingly, this difference is, advantageously, made small. On the other hand, the smaller the difference, the more difficult it is to insert the fiber. To accommodate these competing considerations, a tapered hole is advantageously used, as illustrated in FIG. 3. The latter shows a fiber connector with pressure plates 31 and 32 having tapered apertures wherein the aperture diameter D, at the outside surfaces of the plates, is large enough to accommodate easily the fiber 37. This diameter, however, tapers to a smaller diameter d, equal to the diameter of the core 30, at the inner surfaces of the plates. By making the smaller diameter only slightly larger than the outside diameter of the fibers, very little radial displacement of the core material is required to couple the fibers. Hence, very little external force is required. Nevertheless, because of the larger diameter access hole, the fibers can be easily inserted into the connector.

Figure 4:
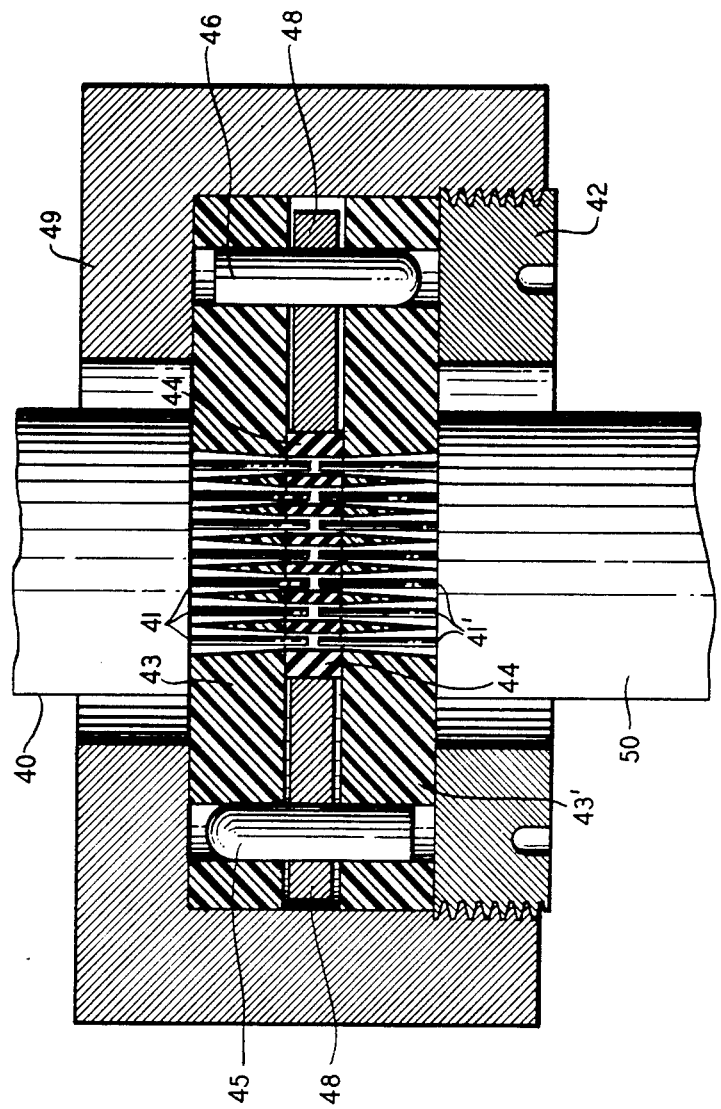
FIG. 4 shows a multifiber connector.

While the discussion has been directed to a single fiber coupler, as a practical matter, all optical transmission systems will be made up of bundles of fibers, or fiber cables. Accordingly, FIG. 4, now to be considered, shows a cross section of a multifiber connector incorporating the features of the present invention. In this embodiment, the core includes a deformable inner portion 44, which is provided with a plurality of holes of essentially uniform diameter, surrounded by a rigid outer retaining ring 48. Similarly, the pressure plates 43 and 43' are provided with an equal plurality of apertures which are aligned with the core holes. Advantageously, the apertures in the pressure plates are tapered, increasing in diameter from their inner to their outer surfaces, making it easier to insert the fibers into the core material, as explained hereinabove.

Pressure is exerted upon the core material by means of threaded ring 42 which contacts the lower pressure plate 43', and engages a threaded annular nut 49, which contacts the upper pressure plate 43. A pair of aligning pins 45 and 46, inserted in holes in pressure plates 43 and 43', and retaining ring 48, aligns the fiber holes in the pressure plates and the core.

To connect the fibers 41 and 41' of a pair of optical cables 40 and 50, the cables are inserted through the apertures in ring 42 and nut 49, and their outer protective jackets are stripped back, exposing the individual fibers. After inserting the fibers of the two cables through the holes in the two pressure plates, and into the core, pressure is applied to core 44 by threading nut 49 onto ring 42 and tightening it. The tightening proceeds until the core deformation is sufficient to align the fibers and secure their connection.

It is apparent that various mechanical modifications of the above-described connector can be made. Thus, in all cases it is understood that the above-described arrangements are only illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. An optical fiber connector comprising:
   a deformable core having a hole therethrough for receiving the fibers to be connected;
   a pair of pressure plates disposed along opposite sides of said core;
   and means for applying a force to said plates in a direction parallel to said fibers for radially deforming said core, thereby simultaneously aligning and mechanically securing said fibers.

2. The connector according to claim 1 wherein said core has a plurality of holes for connecting the fibers of a pair of fiber cables.

3. The connector according to claim 1 wherein said core hole is of uniform diameter.

4. The connector according to claim 1 wherein each pressure plate has aperture having an outer diameter D, and a smaller inner diameter $d$ equal to the diameter of said core.

5. The connector according to claim 2 wherein the diameters of said core holes are uniform;
   wherein each pressure plate has an equal plurality of holes aligned with said core holes;
   and wherein the diameter of hole in each of said pressure plate increases from a first diameter, equal to said core holes, at its inner surface, to a second, larger diameter at its outer surface.

6. The connector according to claim 1 wherein said core is made of silicone rubber.

7. The connector according to claim 1 wherein the fibers to be connected are solid core fibers.

8. The connector according to claim 1 wherein the fibers to be connected are liquid core fibers.

* * * * *